(12) United States Patent
Henrikson et al.

(10) Patent No.: US 9,094,411 B2
(45) Date of Patent: Jul. 28, 2015

(54) MECHANISM TO RESUME FILTER CRITERIA AT A SPECIFIC POINT

(75) Inventors: Eric H. Henrikson, Redmond, WA (US); Angelica T. Remoquillo, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1605 days.

(21) Appl. No.: 12/148,100

(22) Filed: Apr. 16, 2008

(65) Prior Publication Data

US 2009/0262920 A1    Oct. 22, 2009

(51) Int. Cl.
| | |
|---|---|
| H04L 12/66 | (2006.01) |
| H04L 29/06 | (2006.01) |
| H04L 29/08 | (2006.01) |
| G06F 15/16 | (2006.01) |
| H04M 7/00 | (2006.01) |

(52) U.S. Cl.
CPC ............ *H04L 65/1016* (2013.01); *H04L 67/16* (2013.01)

(58) Field of Classification Search
CPC ........... H04L 65/1016; H04L 65/1069; H04L 65/1006; H04L 12/66; H04L 65/1073; H04L 65/1023; H04L 65/1033; H04L 29/06; H04L 65/1063; H04L 65/1083; H04L 67/14; H04L 67/24; H04L 65/1046
USPC ......... 370/351, 352, 353, 354, 355, 356, 357; 709/206, 207, 224, 227, 228, 229, 238; 726/21
See application file for complete search history.

(56) References Cited

U.S. PATENT DOCUMENTS

2003/0236896 A1*  12/2003  Isomaki et al. ............... 709/229
2004/0184432 A1*   9/2004  Gateva et al. ................. 370/349
2004/0193727 A1*   9/2004  Varga et al. .................. 709/238
2005/0002381 A1*   1/2005  Westman et al. ............. 370/352
2005/0050194 A1*   3/2005  Honeisen et al. ............. 709/224
2005/0190772 A1*   9/2005  Tsai et al. ................. 370/395.52

(Continued)

FOREIGN PATENT DOCUMENTS

WO    WO 2007042661 A1 *   4/2007
WO    WO 2007060074 A1 *   5/2007

OTHER PUBLICATIONS

J. Van Elburg; RFC 5502: The SIP P-Served-User Private-Header (P-Header) for the 3GPP IP Multimedia (IM) Core Network (CN) Subsystem; IETF Trust; pp. 1-14.*

*Primary Examiner* — Ahmad F Matar
*Assistant Examiner* — Kharye Pope
(74) *Attorney, Agent, or Firm* — Patti & Malvone Law Group, LLC

(57) ABSTRACT

The present invention provides a method and an apparatus for resuming the evaluation of initial Filter Criteria (iFC) at a specific point. Two new parameters are defined for inclusion in the service logic of application servers and serving Call Session Control Function (S-CSCF) servers. The first parameter, an iFC index parameter, is a number which indicates an index to a current specific position in the iFC evaluation. The S-CSCF may insert the iFC index parameter into route headers of SIP messages that originate from the S-CSCF to the application servers. The second parameter, an iFC resume parameter, is based on the iFC index parameter or another number along with an original dialog identifier, which the application servers may insert into route headers of SIP messages that originate from the application servers to the S-CSCF to indicate a desire to resume operations at the specific position in the iFC evaluation.

21 Claims, 5 Drawing Sheets

(56) References Cited

U.S. PATENT DOCUMENTS

| | | | |
|---|---|---|---|
| 2005/0213606 A1* | 9/2005 | Huang et al. | 370/467 |
| 2006/0291489 A1* | 12/2006 | Naqvi et al. | 370/401 |
| 2007/0005712 A1* | 1/2007 | Tiainen | 709/206 |
| 2007/0055783 A1* | 3/2007 | Gourraud | 709/227 |
| 2007/0088836 A1* | 4/2007 | Tai et al. | 709/227 |
| 2007/0133782 A1* | 6/2007 | Zhu | 379/265.09 |
| 2007/0183411 A1* | 8/2007 | Song et al. | 370/352 |
| 2007/0206568 A1* | 9/2007 | Silver et al. | 370/352 |
| 2007/0280447 A1* | 12/2007 | Cai et al. | 379/114.03 |
| 2008/0104696 A1* | 5/2008 | Li et al. | 726/21 |
| 2008/0146220 A1* | 6/2008 | Duan et al. | 455/432.1 |
| 2009/0073964 A1* | 3/2009 | Milinski et al. | 370/352 |
| 2009/0164591 A1* | 6/2009 | Chadli | 709/206 |
| 2009/0190573 A1* | 7/2009 | Siegel et al. | 370/352 |
| 2009/0190577 A1* | 7/2009 | Allen et al. | 370/352 |
| 2010/0049794 A1* | 2/2010 | Shi | 709/203 |
| 2010/0103888 A1* | 4/2010 | Takano et al. | 370/329 |
| 2010/0183007 A1* | 7/2010 | Zhao et al. | 370/389 |
| 2012/0219127 A1* | 8/2012 | Lu et al. | 379/88.17 |

* cited by examiner

MECHANISM TO RESUME FILTER CRITERIA AT A SPECIFIC POINT

TECHNICAL FIELD

This invention relates to the art of telecommunication systems, and more particularly to telecommunication systems in which servers resume initial filter criteria evaluation at a specific point.

BACKGROUND

The Internet Protocol Multimedia Subsystem (IMS) refers to a core network that supports multimedia services based on a future evolution of 3G networks, where there exists only a single core network supporting convergent voice and data services, i.e., multimedia services. The multimedia services are based on Voice over Internet Protocol for signaling and media transport. An IMS core network consists of a variety of standardized functional elements, including, but not limited to, one or more instances of a Call Session Control Function (CSCF), Breakout Gateway Control Function (BGCF), Media Gateway Control Function (MGCF), Home Subscriber Server (HSS), Media Gateways (MGW), and application server (AS). Signaling within the IMS core network is based on the Session Initiation Protocol (SIP) using any interface compatible with the Internet Protocol (IP). Herein, IMS is defined as the system specified by the Third Generation Partnership Project (3GPP), Third Generation Partnership Project 2 (3GPP2) and European Telecommunications Standards Institute (ETSI) Telecommunications and Internet converged Services and Protocols for Advanced Networking (TISPAN).

In the IMS core network, there is a SIP signaling interface between Serving Call Session Control Function (S-CSCF) and the application server that is known as the IP multimedia Service Control (ISC) Interface. One driver for the ISC interface is for the S-CSCF to include a specific application server in the SIP signaling path based on initial Filter Criteria (iFC), i.e., subscriber data. The iFC is defined on the Home Subscriber Server and passed to the S-CSCF for a subscriber being served by the S-CSCF. Each iFC defines conditions, known as Service Point Triggers (SPT), associated with a SIP message and the identity of the application server to contact if the conditions are met. Also, each iFC has a priority that determines the order which multiple application servers would be contacted when multiple iFC conditions are met. Each application server may pass the SIP request back to the S-CSCF for continued iFC analysis or may provide a final SIP response which ends the iFC analysis.

When an application server is invoked via the iFC interface, there may be a situation in which the application server needs to provide a final response to a received SIP request to perform an intermediate action, in addition to the need to give the SIP request back to the S-CSCF to continue with the iFC analysis when it completes the intermediate action. Illustratively, an intermediate action for an application server may be to play an announcement to an originating party of a SIP INVITE request or perform an interactive voice response exchange before continuing to route the call request towards the destination. Disadvantageously, this situation is not easily accomplished with the current standardized definition of the ISC Interface. The application server may send a new instance of the SIP request to the S-CSCF, but the S-CSCF will start the iFC analysis from the beginning.

One prior art alternative is for each application server with service logic to resume processing after providing a final response to the SIP request. When the application server sends the new instance of the SIP request, the application server may include a special parameter or header. The service provider could modify the iFC for all application servers that match the conditions and have higher priority such that a negative condition is added in the service point triggers. Disadvantageously, this alternative is cumbersome and may not work when large numbers of application servers are involved and complex conditions are defined.

SUMMARY

It has been recognized, in accordance with the principles of the invention, that the problems of the prior art can be overcome by a mechanism to resume initial Filter Criteria at a specific point. More specifically, the present invention provides a method having the steps of a) receiving a Session Initiation Protocol (SIP) message from an application server, and b) determining whether the SIP message contains an iFC resume parameter.

Also, the present invention provides an apparatus operable to a) receive a Session Initiation Protocol (SIP) message from an application server, b) determine whether the SIP message contains an initial Filter Criteria (iFC) resume parameter and c) invoke a next application server from an iFC list.

The present invention provides another method having the steps of a) receiving a Session Initiation Protocol (SIP) message from a Serving Call Session Control Function (S-CSCF), and b) determining whether the SIP message contains an iFC index parameter.

The present invention provides another apparatus operable to a) receive a Session Initiation Protocol (SIP) message from a Serving Call Session Control Function (S-CSCF), b) determine whether the SIP message contains an initial Filter Criteria (iFC) index parameter, and c) save the iFC index parameter when the SIP message contains the iFC index parameter.

DETAILED DESCRIPTION

The present invention provides a technique for an application server to resume initial Filter Criteria (iFC) at a specific point. The technique defines a clean mechanism for an application server to indicate how to resume iFC evaluation where it left off without affecting the structure of the iFC service point triggers and without needing to map out the interactions with other application servers. The present invention allows the application server to specify an index number to override a sequential step through by a S-CSCF, and to tell the S-CSCF to jump to the specified index number.

Figure 1:
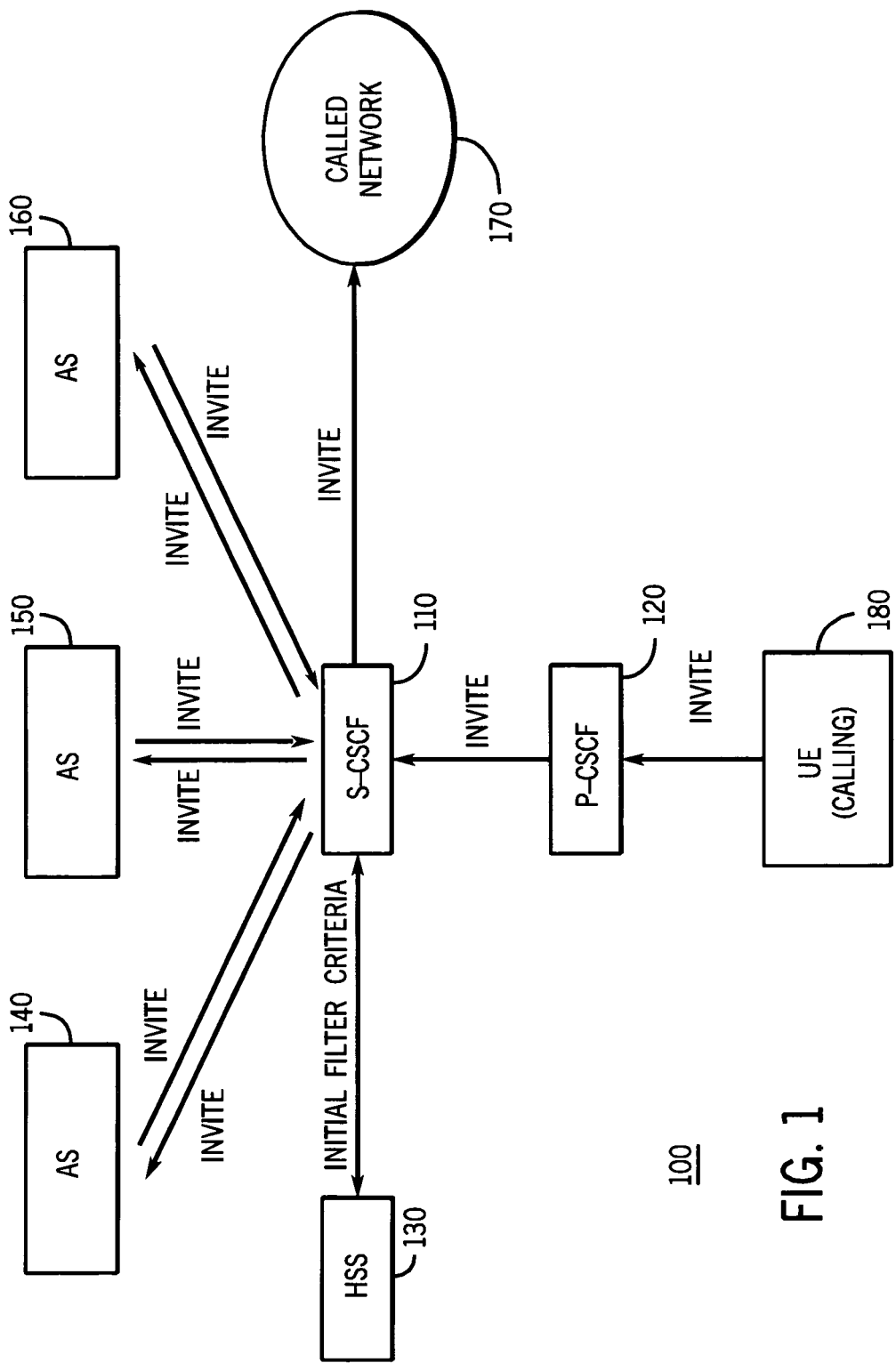
FIG. 1 shows an illustrative embodiment of an Internet Protocol Multimedia Subsystem (IMS) network arranged in accordance with the principles of the invention.

FIG. 1 shows an illustrative embodiment of an Internet Protocol Multimedia Subsystem (IMS) network arranged in accordance with the principles of the invention. The various blocks depicted in FIG. 1 may be implemented using any combination of hardware, software, or firmware using known techniques in accordance with the teachings herein. Also, the various blocks illustrate an exemplary configuration and partition of functions. Those skilled in the art will recognize that the various functions and systems may be implemented in other suitable configurations. In FIG. 1, the IMS network 100 comprises Serving Call Session Control Function (S-CSCF) 110 which manages all session control functions in the IMS network. S-CSCF 110 connects to Proxy Call Session Control Function (P-CSCF) 120, Home Subscriber Server (HSS) 130, application server (AS) 140, AS 150, AS 160 and Called Network 170. Also, user equipment (UE) 180 connects to P-CSCF 120. Note that in FIGS. 1, 2 A and 2 B, identical or analogous parts or elements are generally depicted by identical reference numerals.

HSS 130 is a database that supports the IMS network 100 entities that actually handle calls. HSS 130 contains the subscription-related information, i.e., user profiles and preferences, performs authentication and authorization of the user, and may provide information about the user's physical location. HSS 130 provides iFC to S-CSCF 110 to evaluate when UE 180 registers with P-CSCF 120. The iFC provide information for UE 180 on all application servers that must be contacted based on specified conditions, known as Service Point Triggers (SPT). Thus, an instance of an initial Filter Criterion a) specifies the conditions for S-CSCF 110 to contact an application server, b) identifies which application server S-CSCF 110 should contact if the conditions are met and c) specifies a priority that determines the order in which S-CSCF 110 should contact multiple application servers when multiple iFC conditions are met.

Application servers 140, 150, and 160 host and execute services, e.g., announcements, interactive voice responses, etc., and interface with S-CSCF 110 using the Session Initiation Protocol (SIP) protocol. S-CSCF 110 decides to which application server(s) the SIP message will be forwarded, in order to provide their services.

P-CSCF 120 is the first point of contact for user devices, e.g., UE 180, to the IMS network and controls authentication of the user devices. P-CSCF 120 is assigned to UE 180 during registration, and does not change for the duration of the registration. P-CSCF 120 may be located in a visited network in which UE 180 roams or UE 180's home network. The home network is the network with which the user of UE 180 made his initial service subscription, and the visited network is the network to which the roaming user is currently attached.

P-CSCF 120 and/or S-CSCF 110 are preferably embodied in a server apparatus, but may reside in a computing apparatus such as a mainframe computer or processor or any combination of processors or computers configured to perform the functions described. In the exemplary embodiment, software running on P-CSCF 120 and/or S-CSCF 110 facilitates the overall functionality of S-CSCF 110 and/or P-CSCF 120 as well as the described functions.

An initiating caller, such as the user of UE 180, may connect via P-CSCF 120 to S-CSCF 110 to initiate a communication session with Called Network 170. S-CSCF 110 and P-CSCF 120 communicate via SIP interfaces to establish the communication session with Called Network 170. When S-CSCF 110 evaluates iFC for UE 180, obtained from HSS 130 to establish the communication session, S-CSCF 110 may be instructed to contact one or more application servers, e.g., Application servers 140, 150, and 160, under certain conditions in a priority order, i.e., sequentially, via a SIP INVITE message.

Illustratively, S-CSCF 110 may have received three different iFC that match to INVITE requests with AS 140 having priority 1, AS 150 having priority 2, and AS 160 having priority 3. First, S-CSCF 110 sends an INVITE message to AS 140 and waits for a response. Upon receiving the INVITE request, AS 140 executes service logic and may either provide a response to the INVITE request or give the INVITE request back to S-CSCF 110 to continue iFC evaluation with the next application server. Second, S-CSCF 110 sends an INVITE message to AS 150 and waits for a response. Upon receiving the INVITE request, AS 150 executes service logic and may either provide a response to the INVITE request or give the INVITE request back to S-CSCF 110 to continue iFC evaluation with the next application server. Third, S-CSCF 110 sends an INVITE message to AS 160 and waits for a response. Upon receiving the INVITE request, AS 160 executes service logic and may either provide a response to the INVITE request or give the INVITE request back to S-CSCF 110. After all of the application servers have been contacted sequentially and the communication session is accepted by UE 180, S-CSCF 110 may route media streams or other content from UE 180 to Called Network 170. In FIG. 1, all of the application servers give the INVITE request back to S-CSCF 110 for processing such that the present invention is not required.

Figure 2A:
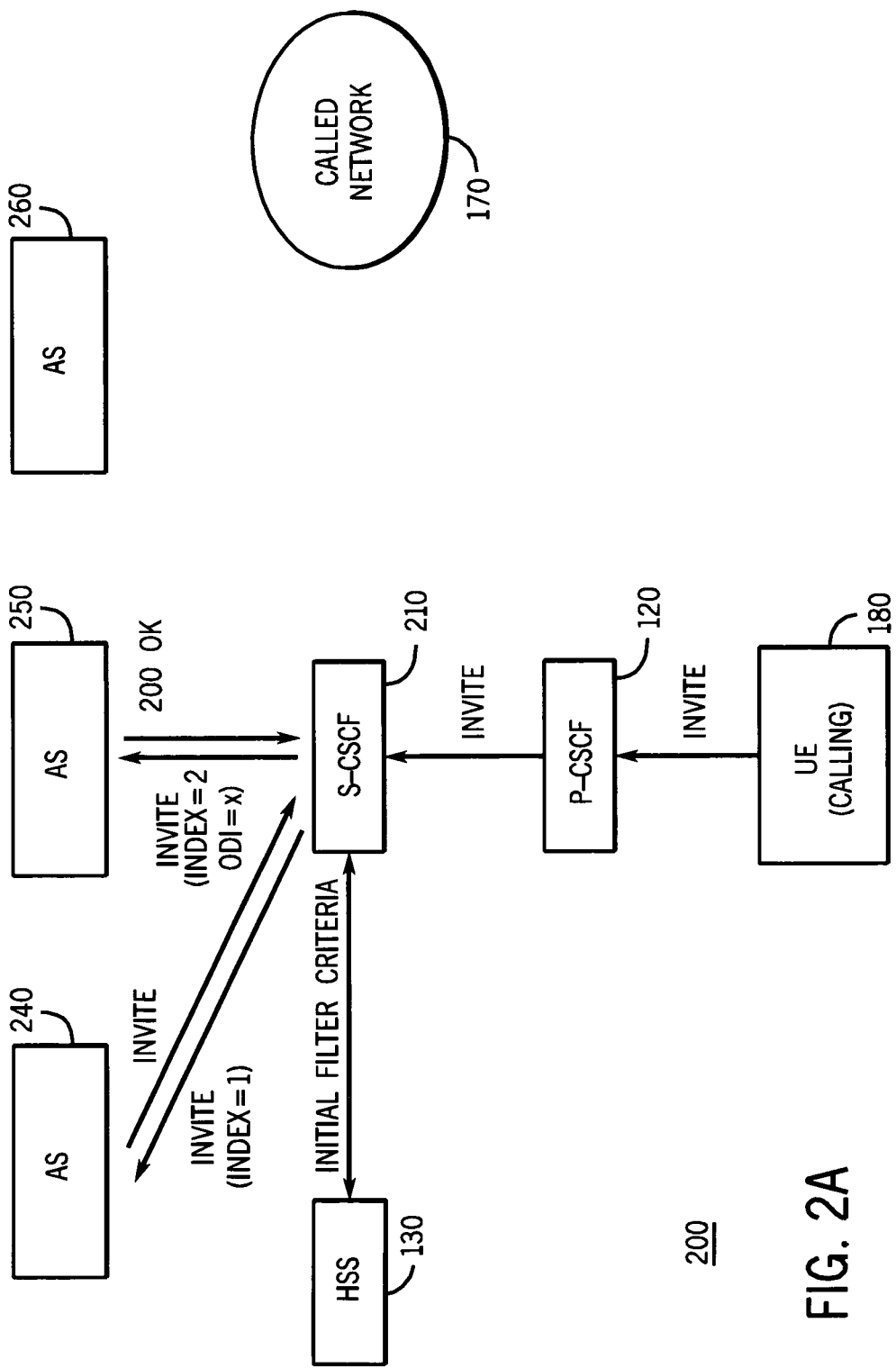
FIG. 2A shows an illustrative embodiment of a Mechanism to Resume Filter Criteria at a Specific Point system arranged in accordance with the principles of the invention.
Figure 2B:
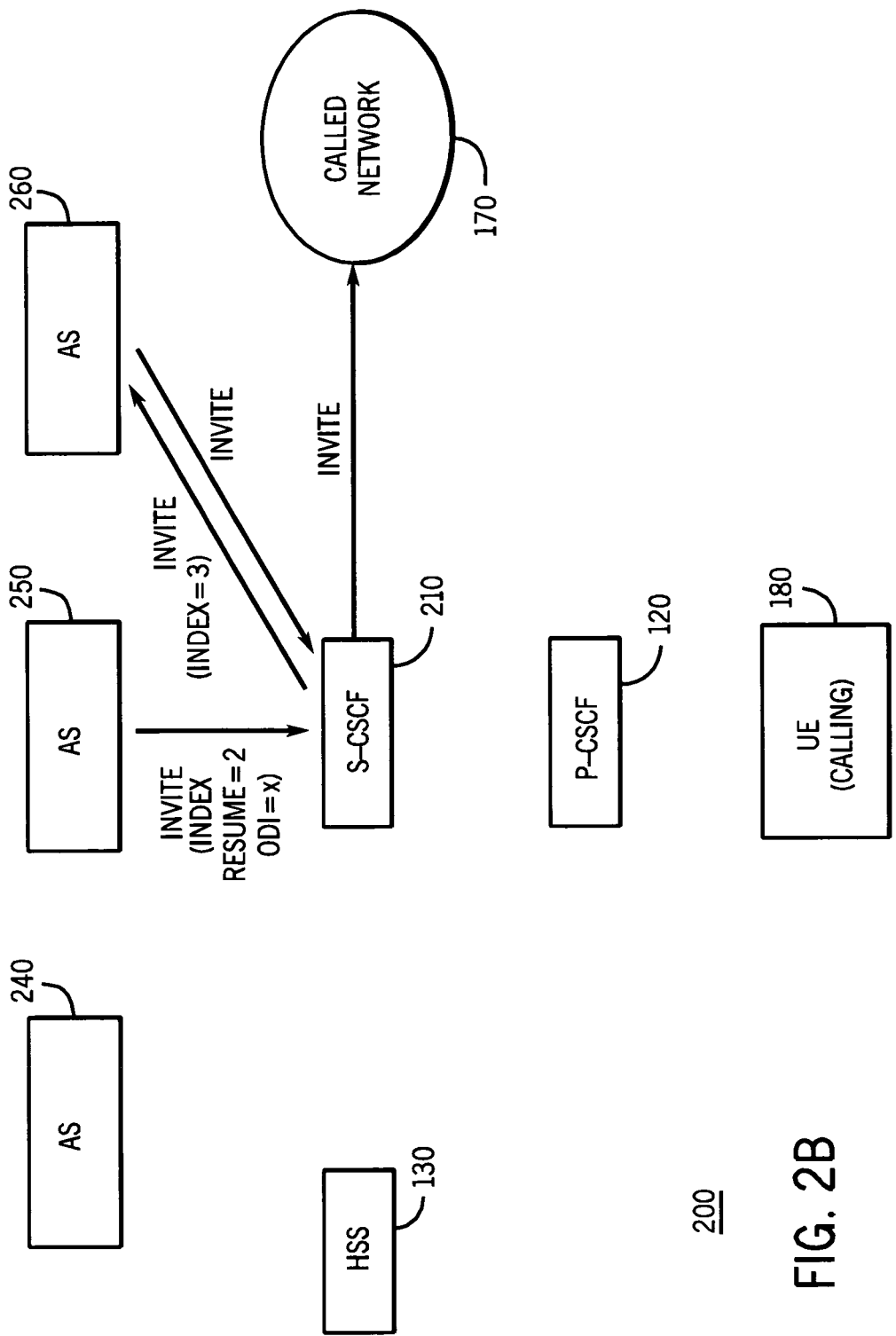
FIG. 2 B shows another illustrative embodiment of the Mechanism to Resume Filter Criteria at a Specific Point system arranged in accordance with the principles of the invention.

FIG. 2A shows an illustrative embodiment of a Mechanism to Resume Filter Criteria at a Specific Point system 200 arranged in accordance with the principles of the invention. In FIG. 2 A, S-CSCF 210 connects to P-CSCF 120, HSS 130, AS 240, AS 250, AS 260 and Called Network 170. Also, UE 180 connects to P-CSCF 120.

In the present invention, two new parameters are defined for inclusion in the service logic of the application servers and the S-CSCF, as shown in FIG. 2 A. The first parameter, an initial Filter Criteria (iFC) index parameter, is a number, e.g., 1, 2, 3, 4, 5, etc., which indicates an index to a current specific position in the iFC evaluation. The S-CSCF may insert the iFC index parameter into route headers of SIP messages that originate from the S-CSCF to the application servers.

The second parameter, an iFC resume parameter, is based on the iFC index parameter or another number along with an original dialog identifier (ODI). The ODI relates a current INVITE message sent from the application server to the S-CSCF to a previous INVITE message sent from S-CSCF to the application server. Note that the S-CSCF sends the ODI to the application server in the INVITE message. The application servers involved in complex conditions, e.g., announcements, interactive voice activation, etc., may insert the iFC resume parameter into route headers of SIP messages that originate from the application servers to the S-CSCF. Thus, when S-CSCF 210 sends a request, e.g., an INVITE message, to an application server, e.g., AS 240 or AS 250, the request may include the iFC index parameter which indicates an index to a current specific position of the request in the iFC evaluation. The application server may return the iFC resume parameter to S-CSCF 210 in a later INVITE message after a final response, to indicate a desire to resume operations at the specific position in the iFC evaluation.

In FIG. 2 A, when the user of UE 180 initiates a communication session with Called Network 170, S-CSCF 210 evaluates the iFC for UE 180. Illustratively, S-CSCF 210 may have received three different iFC from HSS 130 that match to INVITE requests with AS 240 having priority 1, AS 250 having priority 2, and AS 260 having priority 3. S-CSCF 210 sends an INVITE message to AS 240 that has an iFC index parameter in the route header set to 1, i.e., the current position in the iFC evaluation. Upon receiving the message, AS 240 may determine whether the message contains the iFC index parameter by reading the route header. If AS 240 has knowledge of the index parameter, AS 240 may save the iFC index parameter value and the ODI in case the iFC index parameter will be needed to be sent back to S-CSCF 210 to control subsequent iFC handling at S-CSCF 210. AS 240 optionally sets a local iFC index parameter value equal to the received iFC index parameter, i.e., 1, and responds to S-CSCF 210 with an INVITE message, i.e., AS 240 passes the INVITE request back to the S-CSCF 210 for continued iFC evaluation. The local iFC index parameter refers to a local temporary variable used within AS 240 to identify the iFC index parameter value.

Next, S-CSCF 210 sends an INVITE message to AS 250 that has an iFC index parameter in the route header set to 2, i.e., the current position in the iFC evaluation. Upon receiving the message, AS 250 may determine whether the message contains the iFC index parameter by reading the route header. AS 250 may save the iFC index parameter value and the ODI in case the iFC index parameter will be needed to be sent back to S-CSCF 210 to control subsequent iFC handling at S-CSCF 210. AS 250 sets a local iFC index parameter value equal to the received iFC index parameter, i.e., 2. Next, AS 250 executes application server service logic with a procedure to send a 200 OK SIP message to S-CSCF 210, which is a final response to the INVITE message in the SIP protocol. In other words, this is the end of the iFC evaluation. However, in this embodiment of the present invention, S-CSCF 210 will know the specific point in the iFC where the evaluation has ended if AS 250 should contact S-CSCF 210 again to continue service processing.

FIG. 2 B shows another illustrative embodiment of a Mechanism to Resume Filter Criteria at a Specific Point system 200 arranged in accordance with the principles of the invention. In FIG. 2 B, AS 250 contacts S-CSCF 210 to resume service processing at the point where iFC evaluation ended by sending a new INVITE message to S-CSCF 210 with an iFC resume parameter set to 2 in the route header. Note that "2" is the iFC index parameter value previously received by AS 250 from S-CSCF 210 in FIG. 2 A. Illustratively, AS 250 may connect UE 180 to an external interactive voice response system for Prompt & Collect operation before connecting UE 180 to Called Network 170. After the Prompt & Collect operation is completed, AS 250 re-connects UE 180 to Called Network 170. This is done by sending the INVITE to UE 180 via S-CSCF 210 as a new call.

In the prior art, if AS 250 sends a new INVITE message to S-CSCF 210, then iFC evaluation starts over and AS 240 and AS 250 are each included in the signaling path for a second time. However, in this embodiment of the present invention, S-CSCF 210 will not start the iFC evaluation from the beginning as done in the prior art. Upon receiving the iFC resume parameter, S-CSCF 210 sets an internal index number and resumes iFC evaluation at the provided index point. The internal index number refers to a local temporary variable used within S-CSCF 210 to identify the next iFC index value to be processed, thus overriding the sequential processing of iFC.

Next, S-CSCF 210 sends an INVITE message to AS 260 that has an iFC index parameter in the route header set to 3, i.e., the current position in the iFC evaluation. Upon receiving the message, AS 260 may determine whether the message contains the iFC index parameter by reading the route header. If AS 260 has knowledge of the iFC index parameter, AS 260 may save the iFC index parameter value and the ODI in case the iFC index parameter will be needed to be sent back to S-CSCF 210 to control subsequent iFC handling at S-CSCF 210. AS 260 optionally sets a local iFC index parameter value equal to the received iFC index parameter, i.e., 3, and responds to S-CSCF 210 with an INVITE message, i.e., AS 260 passes the INVITE request back to the S-CSCF 210 for continued iFC evaluation. Finally, S-CSCF 210 sends an INVITE message to Called Network 170, and the communication session between UE 180 and Called Network 170 may begin.

Figure 3:
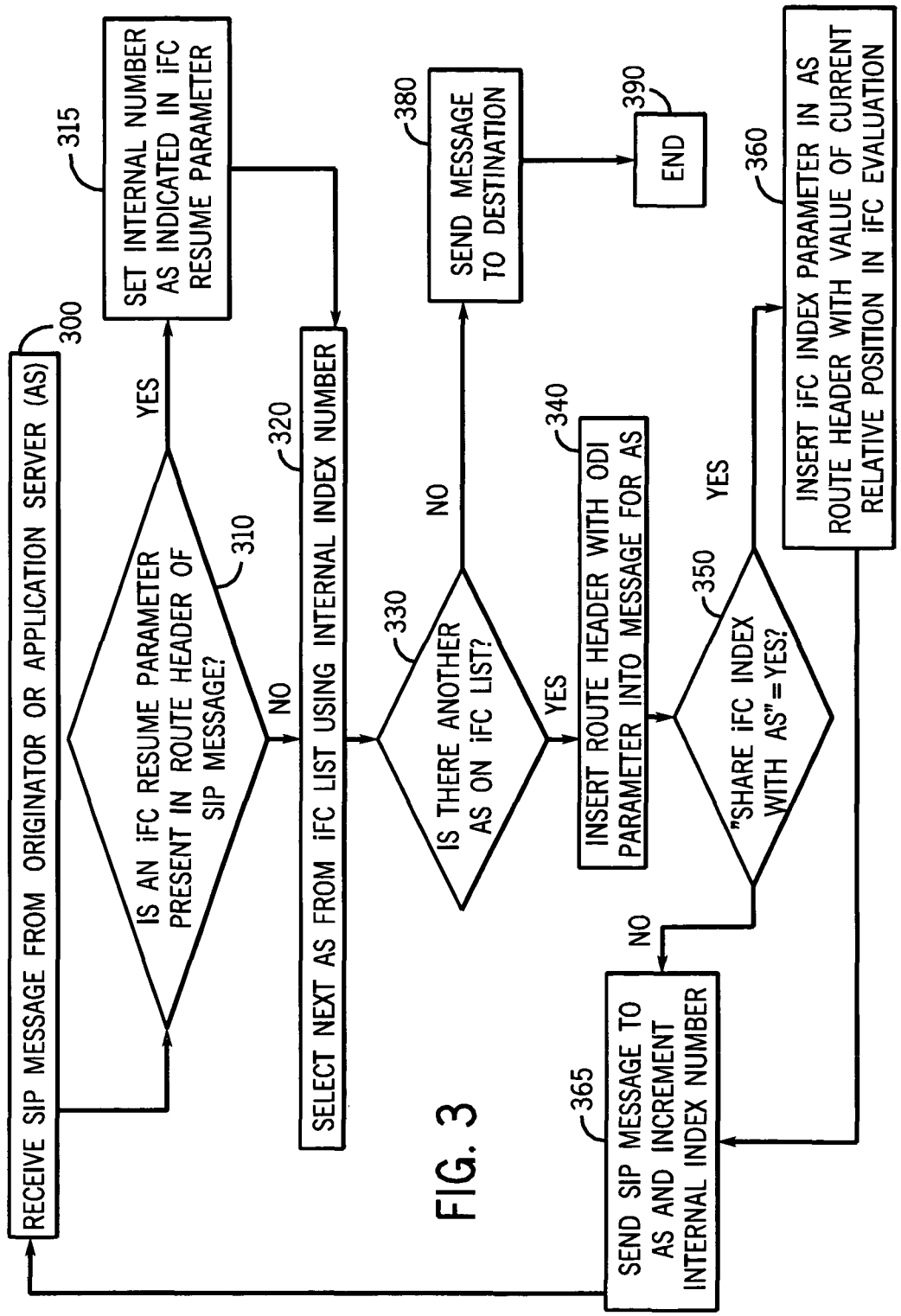
FIG. 3 shows an illustrative flow chart for a method of operating the present invention arranged in accordance with the principles of the invention.

FIG. 3 shows an illustrative flow chart for a method of operating the present invention arranged in accordance with the principles of the invention. The process is entered in step 300 when a S-CSCF, e.g., S-CSCF-210 (FIG. 2 B) either receives an initial SIP request from P-CSCF 120 (FIG. 1) or an Interrogating-CSCF (I-CSCF), not shown, which indicates the start of the iFC sequence, or receives a SIP message from an application server, e.g., AS 250 (FIG. 2 B), which may be the start or continuation of the iFC sequence. The SIP message may be an INVITE message or other SIP request.

In step 310 (FIG. 3), it is necessary to determine whether the SIP message contains an iFC resume parameter in the route header.

If the test result in conditional branch point 310 (FIG. 3) is YES, indicating that iFC resume parameter is contained in the SIP message, then control is passed to step 315 (FIG. 3). In step 315, S-CSCF 210 (FIG. 2 B) sets an internal index value equal to the iFC resume parameter value. Control is passed to step 320 (FIG. 3). If the test result in conditional branch point 310 is NO, indicating that iFC resume parameter is not contained in the SIP message, then control is passed to step 320 (FIG. 3).

In step 320 (FIG. 3), S-CSCF 210 (FIG. 2 B) selects another application server from an iFC list as part of the iFC evaluation.

In step 330 (FIG. 3), it is necessary to determine whether additional application servers are on the iFC list.

If the test result in conditional branch point 330 (FIG. 3) is NO, indicating that there are no additional application servers on the iFC list, then control is passed to step 380 (FIG. 3). If the test result in conditional branch point 330 is YES, indicating there are additional application servers on the iFC list, then control is passed to step 340 (FIG. 3).

In step 340 (FIG. 3), S-CSCF 210 (FIG. 2 B) inserts a route header with the ODI parameter into a message for the next application server, e.g., AS 260 (FIG. 2 B), on the iFC list. (The S-CSCF inserts two route headers. The first one is for the application server and the second one is for the S-CSCF. The second one is for the application server to use to send the request back to the S-CSCF if the application server logic indicates to send the request back).

In step 350 (FIG. 3), it is necessary to determine whether a "share iFC index with application server" condition has occurred. The "share iFC index with application" condition is a database configuration flag used to control when to send the iFC index parameter to the application server. If the network does not have any application servers that require this invention, then the invention may be disabled. If there is at least one application server that needs this invention, then the database configuration flag should be activated.

If the test result in conditional branch point 350 (FIG. 3) is NO, indicating that the "share iFC index with application server" condition has not occurred, then control is passed to step 365 (FIG. 3). If the test result in conditional branch point 350 is YES, indicating that the "share iFC index with application server" condition has occurred, then control is passed to step 360 (FIG. 3).

In step 360 (FIG. 3), S-CSCF 210 (FIG. 2 B) inserts an iFC index parameter into the route header of the SIP message in response to the "share iFC index with application server" condition. The value of the iFC index parameter is a value of a current position in the iFC evaluation.

In step 365 (FIG. 3), S-CSCF 210 (FIG. 2 B) transmits the SIP message to the application server and increments the internal index number by 1.

In step 380 (FIG. 3), S-CSCF 210 (FIG. 2 B) establishes a communication session between a caller, e.g., UE 180 (FIG. 2 B) and a called party, e.g., Called Network 170 (FIG. 2 B). Then control is passed to step 390 (FIG. 3).

The process is exited in step 390.

Figure 4:
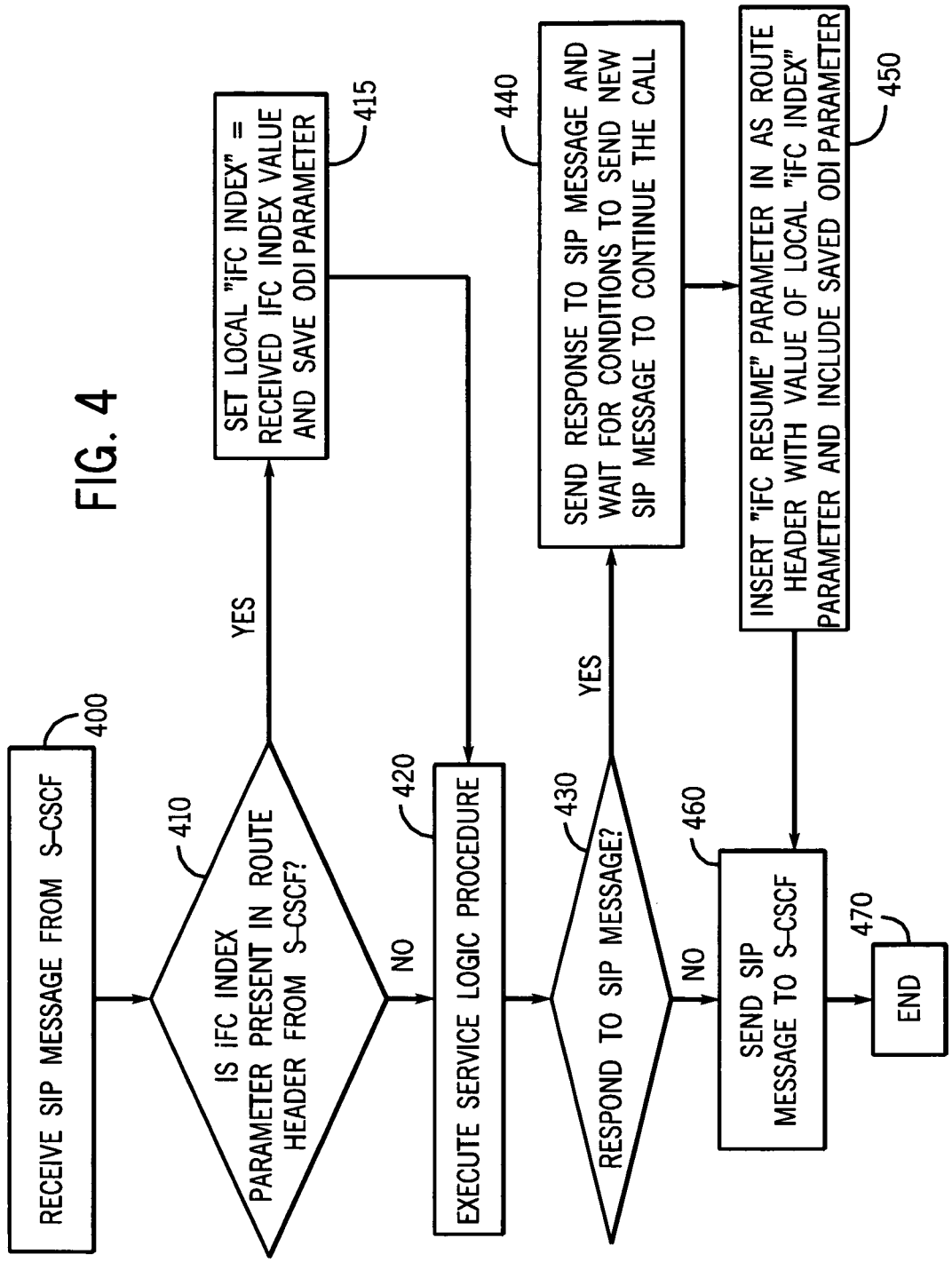
FIG. 4 shows another illustrative flow chart for a method of operating the present invention arranged in accordance with the principles of the invention.

FIG. 4 shows another illustrative flow chart for a method of operating the present invention arranged in accordance with the principles of the invention. The process is entered in step 400 when an application server, e.g., AS 250 (FIG. 2 A) receives a SIP message from a S-CSCF, e.g., S-CSCF-210 (FIG. 2 A).

In step 410 (FIG. 4), it is necessary to determine whether the SIP message contains an iFC index parameter in the route header. The SIP message may be an INVITE message or other SIP request.

If the test result in conditional branch point 410 (FIG. 4) is YES, indicating that iFC index parameter is contained in the SIP message, then control is passed to step 415 (FIG. 4). In step 415, AS 250 (FIG. 2 A) saves the index parameter value and the ODI in case the iFC index parameter will be needed to be sent back to S-CSCF-210 (FIG. 2 A) to control subsequent iFC handling at S-CSCF-210. AS 250 (FIG. 2 A) sets a local iFC index parameter value equal to the received iFC index parameter. Control is passed to step 420 (FIG. 4). If the test result in conditional branch point 410 is NO, indicating that iFC index parameter is not contained in the SIP message, then control is passed to step 420 (FIG. 4).

In step 420 (FIG. 4), AS 250 (FIG. 2 A) executes a service logic procedure.

In step 430 (FIG. 4), it is necessary to determine whether AS 250 (FIG. 2 B) should respond to the SIP message.

If the test result in conditional branch point 430 (FIG. 4) is YES, indicating that AS 250 (FIG. 2 B) should respond to the SIP message, then control is passed to step 440 (FIG. 4). If the test result in conditional branch point 430 is NO, indicating that AS 250 (FIG. 2 B) should not respond to the SIP message, then control is passed to step 460 (FIG. 4).

In step 440 (FIG. 4), AS 250 (FIG. 2 B) sends S-CSCF-210 (FIG. 2 B) a response to the received SIP message and waits for conditions to send a new SIP message to S-CSCF-210 (FIG. 2 B) to continue a call. Note that the application server, e.g., AS 250 (FIG. 2 B), may have multiple service logic conditions that may result in more than INVITE being sent to the S-CSCF, e.g., S-CSCF-210 (FIG. 2 B), using the iFC resume parameter and ODI.

In step 450 (FIG. 4), AS 250 (FIG. 2 B) inserts an iFC resume parameter in a route header of the new SIP message. The iFC resume parameter is a function of the local iFC index parameter and the saved ODI.

In step 460 (FIG. 4), AS 250 (FIG. 2 B) sends the new SIP message to the S-CSCF-210 (FIG. 2 B).

The process is exited in step 470.

Those skilled in the art will recognize that embodiments of the invention are not limited to SIP INVITE messages. The present invention may be used with any type of SIP message, e.g., MESSAGE, OPTIONS, SUBSCRIBE, PUBLISH and REFER.

Also, those skilled in the art will recognize that embodiments of the invention are not limited to only one instance of an INVITE request sent from the application server with the resume index number. The present invention may be used with multiple INVITE requests, or other SIP requests, sent from the application server with the iFC resume parameter, such as when the application server is a Back-to-Back User Agent (B2BUA). Illustratively, a caller may call into an application server that authorizes the caller for a service, and then the caller directs the application server to make outbound calls in sequence to multiple destinations. The application server uses multiple INVITE requests with the iFC resume parameter to complete the request.

In practice, telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method to resume initial filter criteria (iFC) evaluation at a specific point in a Serving Call Session Control Function (S-CSCF), the method comprising the steps of:

sending, at the S-CSCF to an application server, a Session Initiation Protocol (SIP) INVITE message that has an iFC index parameter in a route header of the SIP INVITE message, wherein the iFC index parameter is a number indicative of a specific position in the iFC evaluation;

receiving, at the S-CSCF from the application server, a final response to the SIP INVITE message to end the iFC evaluation;

receiving, at the S-CSCF after the final response, a new SIP INVITE message from the application server that contains an iFC resume parameter;

determining, at the S-CSCF, that the new SIP INVITE message contains the iFC resume parameter; and resuming, at the S-CSCF, service processing at the specific position where the iFC evaluation ended, the specific position being indicated by the iFC resume parameter set to a value of the iFC index parameter.

2. The method of claim 1 wherein the iFC resume parameter is a function of the iFC index parameter and an original dialog identifier (ODI).

3. The method of claim 1 wherein the final response is a 200 OK SIP message.

4. The method of claim 1 further comprising the step of setting, at the S-CSCF, an internal index number when the new SIP INVITE message contains the iFC resume parameter.

5. The method of claim 4 further comprising the step of selecting, at the S-CSCF, a next application server from an iFC list using the internal index number.

6. The method of claim 5 further comprising the step of establishing, at the S-CSCF, a communication session between a caller and a called party after each application server from the iFC list has been contacted.

7. The method of claim 5 further comprising the step of inserting, at the S-CSCF, another iFC index parameter into a route header of another new SIP INVITE message for the next application server in response to a share iFC index with application server condition.

8. The method of claim 7 further comprising the steps of:
transmitting, at the S-CSCF, the another new SIP INVITE message to the next application server; and
incrementing, at the S-CSCF, the internal index number by 1.

9. A Serving Call Session Control Function (S-CSCF) configured to
send, to an application server, a Session Initiation Protocol (SIP) INVITE message that has an initial Filter Criteria (iFC) index parameter in a route header of the SIP INVITE message, wherein the iFC index parameter is a number indicative of a specific position in an iFC evaluation;
receive, from the application server, a final response to the SIP INVITE message to end the iFC evaluation;
receive, after receipt of the final response, a new SIP INVITE message from the application server that contains an iFC resume parameter;
determine that the new SIP INVITE message contains the iFC resume parameter;
resume service processing at the specific position where the iFC evaluation ended, the specific position being indicated by the iFC resume parameter set to a value of the iFC index parameter contained in the SIP message; and
invoke a next application server from an iFC list.

10. The S-CSCF of claim 9, wherein the S-CSCF is configured to insert another iFC index parameter into a route header of another new SIP INVITE message for the next application server in response to a share iFC index with application server condition and transmit the another new SIP INVITE message to the next application server.

11. A method for an application server to resume initial Filter Criteria (iFC) evaluation at a specific point, the method comprising the steps of:
receiving, at the application server, a Session Initiation Protocol (SIP) INVITE message from a Serving Call Session Control Function (S-CSCF);
reading, at the application server, a route header of the SIP INVITE message to determine whether the SIP INVITE message contains an iFC index parameter, wherein the iFC index parameter is a number indicative of a current specific position in the iFC evaluation;
saving, at the application server, the iFC index parameter and an original dialog identifier (ODI) when the SIP INVITE message contains the iFC index parameter;
sending, at the application server to the S-CSCF, a final response to the SIP INVITE message to end the iFC evaluation; and
sending, at the application server to the S-CSCF after the final response, a new SIP INVITE message that contains an iFC resume parameter to indicate to resume service processing at the current specific position where the iFC evaluation ended, the current specific position being indicated by the iFC resume parameter set to a value of the iFC index parameter.

12. The method of claim 11 wherein the iFC index parameter has a value selected from the group consisting of 1, 2, 3, 4 and 5.

13. The method of claim 11 wherein the final response is a 200 OK SIP message.

14. The method of claim 11 further comprising the step of:
setting, at the application server, a local iFC index parameter value equal to the iFC index parameter.

15. The method of claim 14 further comprising the step of executing, at the application server, a service logic procedure.

16. The method of claim 15 further comprising the step of:
waiting, at the application server, for Service Point Triggers to send the new SIP INVITE message to the S-CSCF to continue a call.

17. The method of claim 14, wherein the iFC resume parameter is a function of the local iFC index parameter and the ODI.

18. An application server configured to
receive a Session Initiation Protocol (SIP) INVITE message from a Serving Call Session Control Function (S-CSCF);
determine whether the SIP INVITE message contains an initial Filter Criteria (iFC) index parameter, wherein the iFC index parameter is a number indicative of a current specific position in an iFC evaluation;
save the iFC index parameter when the SIP INVITE message contains the iFC index parameter;
send, to the S-CSCF, a final response to the SIP INVITE message to end the iFC evaluation;
insert an iFC resume parameter set to a value of the iFC index parameter into a route header of a new SIP INVITE message; and
send, after the final response, the new SIP INVITE message to the S-CSCF to resume the service processing at the current specific position where the iFC evaluation ended, the current specific position being indicated by the iFC resume parameter.

19. The application server of claim 18 wherein the application server is configured to
set a local iFC index parameter value equal to the iFC index parameter.

20. The application server of claim 19, wherein the application server is a Back-to-Back User Agent, and wherein the application server is configured to send multiple INVITE messages with the iFC resume parameter to the S-CSCF.

21. The method of claim 2, wherein the ODI relates a current SIP INVITE message sent from the application server to the S-CSCF to a previous SIP INVITE message sent from S-CSCF to the application server.

* * * * *